March 31, 1942.　　　H. R. DOWNS　　　2,277,746

FLUID REGULATOR

Filed March 20, 1939　　　2 Sheets-Sheet 1

INVENTOR
*Harold R. Downs*
BY *Barry & Cyr*
ATTORNEYS

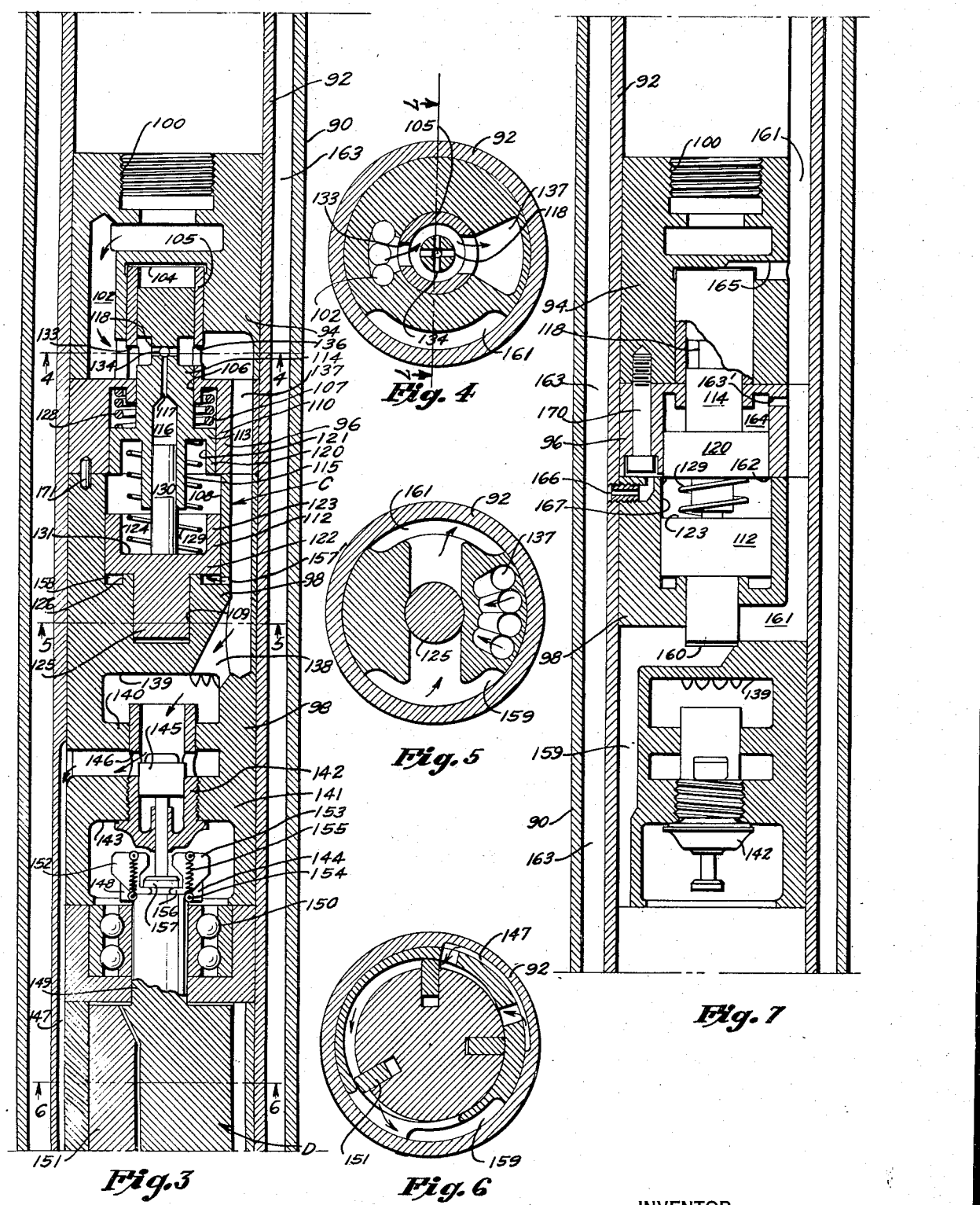

Patented Mar. 31, 1942

2,277,746

UNITED STATES PATENT OFFICE 2,277,746

FLUID REGULATOR

Harold R. Downs, Tulsa, Okla.

Application March 20, 1939, Serial No. 263,021

8 Claims. (Cl. 121—1)

This invention relates to a method and apparatus for controlling the velocity of fluid motors, and more particularly, but not by way of limitation, to a fluid pressure regulator for controlling the volume of fluid to a fluid motor adapted for use with a rotary pump or other fluid operated apparatus.

Under ordinary conditions in the feeding of fluid such as air or gas into a motor, the fluid is relatively constant as to pressure, and when the discharge or exhaust fluid from the motor is substantially atmospheric or some known constant pressure then the speed of the motor can be regulated by an orifice. However with a fluid motor being used to actuate a rotary pump or the like apparatus by a positively connected shaft, it has been found that due to varying load conditions upon the fluid operated apparatus that the torque demand of the shaft will not remain constant. With a constant fluid input pressure and output pressure of the fluid motor maintained, any varying torque condition can be controlled by means of a governor or the like, thus causing the governor to vary the amount or volume of input gas according to the torque load. However, if neither the motor fluid input pressure, the motor fluid discharge pressure, nor the torque load on the motor are constant, it is necessary to maintain a volume to the motor that will deliver the necessary amount of power up to the limitations of the fluid actuated apparatus.

In the use of a fluid motor for actuating a rotary pump or like apparatus wherein the discharge pressure from the motor is injected into the flow line from the pump in order to assist the pump in its pumping action, the discharge pressure must necessarily be higher than the pump back pressure and consequently must be increased as the back pressure in the pumping line is increased. With such condition there is a varying fluid input pressure to the motor complementary with a varying fluid discharge pressure of the motor, as well as a varying torque demand on the motor dependent upon the pump load.

The conventional governors used today in fluid actuated engines are only concerned with controlling the speed of the engine and do not in any manner attempt to control the input fluid in volume to maintain the necessary power for actuating the engine at full capacity under any varying load conditions of the engine.

It is therefore an important object of this invention to provide a method of controlling the velocity of fluid to a fluid motor adapted to be used under varying load conditions.

And still another important object of this invention is to provide a method for maintaining the volume of fluid to a motor substantially constant when the torque load demanded of the motor is subjected to variances.

And still another important object of this invention is to provide a fluid pressure regulator adapted for use with a fluid actuated apparatus operating against a variable back pressure, wherein said regulator is so constructed and arranged as to maintain a constant volume for the fluid actuating the apparatus.

And still another important object of this invention is to provide a fluid pressure regulator adapted to automatically maintain a fluid speed to a motor for maintaining a differential pressure across the motor sufficient to operate the motor at maximum speed, regardless of any change in load dependent on the motor.

A further object of my invention is to provide a fluid regulator which controls the velocity of fluid to a motor so that there is supplied only the amount of fluid necessary to actuate the motor at maximum speed for any particular load condition, thus providing efficient and economic operation of the motor as well as an economic use of the fluid.

An additional object of my invention is to provide a fluid pressure regulator for a fluid motor wherein said regulator is actuated by the fluid input to the motor simultaneous with the fluid discharge from the motor, to economically meter only the necessary amount of fluid for actuating the motor the maximum horse-power for any particular load condition.

And still another object of my invention is to provide a fluid pressure regulator, which will be simple in construction, inexpensive in manufacture, and efficient in operation.

Other objects and advantages of my invention will be evident from the following detailed description read in conjunction with the accompanying drawings which illustrate my new invention.

In the figures:

Fig. 3 is a view on a smaller scale of a fragmentary sectional elevation of a modified form of my invention.

Fig. 4 is a view taken on lines 4—4 of Fig. 3.

Fig. 5 is a view taken on lines 5—5 of Fig. 3.
Fig. 6 is a view taken on lines 6—6 of Fig. 3.
Fig. 7 is a view similar to Fig. 3 taken on lines 7—7 of Fig. 4.

Figure 1:
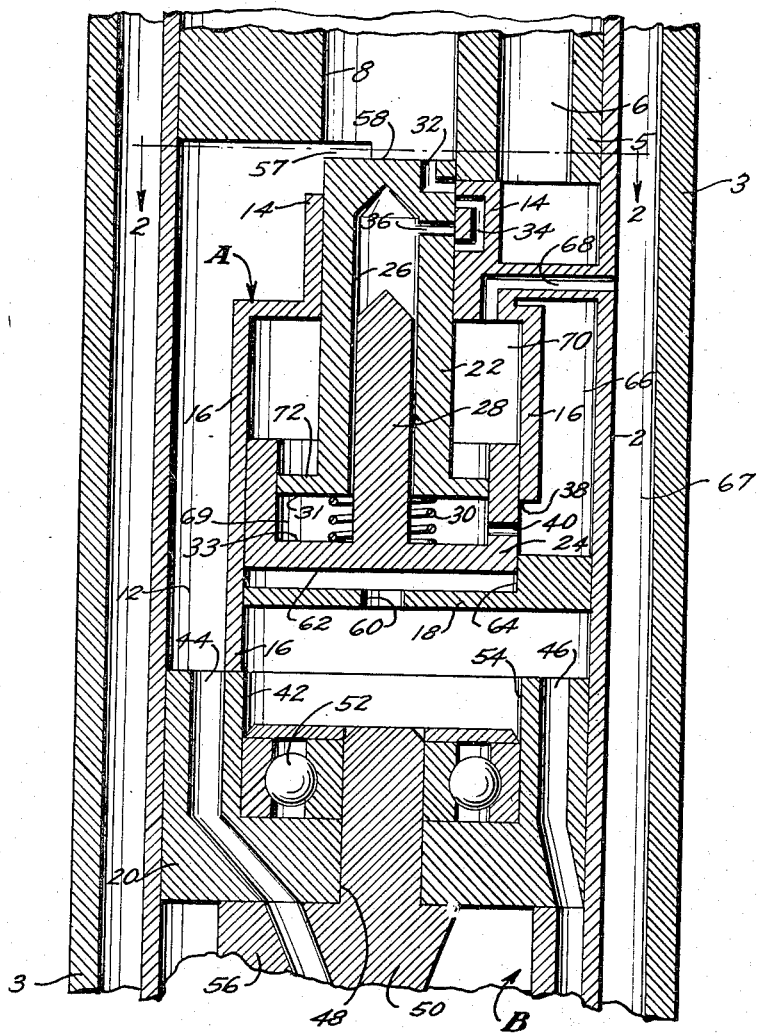
Fig. 1 is a fragmentary sectional elevational view of the preferred embodiment of my invention.

Referring to the drawings in detail, and more particularly to Figure 1, reference 2 indicates an outer cylinder forming a housing for a control unit A used in conjunction with a fluid motor B (partially shown). It will be understood that the cylinder 2 can be of any particular design for housing the control unit A, but in the present instance the structure is arranged for use with a fluid motor adapted to actuate a bottom hole rotary oil pump (not shown), wherein the shell or cylinder 2 may be disposed within a housing 3 for the pump.

Figure 2:
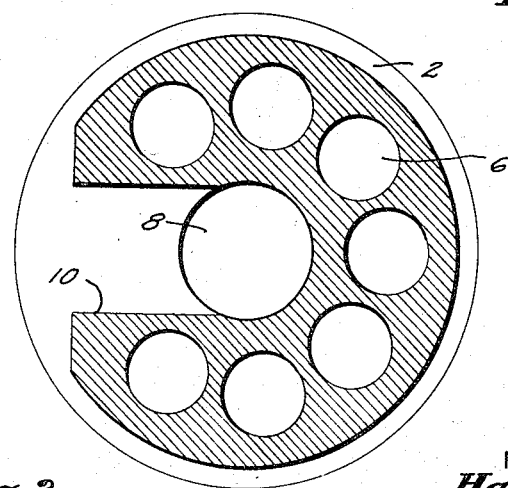
Fig. 2 is a view taken on lines 2—2 of Fig. 1.

A manifold 5 is fixed in the cylinder 2 and comprises a plurality of outlet apertures 6 (Fig. 2) and a single inlet aperture 8. The aperture 8 is in communication with a source of motive fluid, such as a surface reservoir of compressed air or gas (not shown) to be hereinafter designated as supply fluid. The manifold 5 is provided with a cut-away portion 10 in communication with the port 8, and a port 12 leading to the fluid motor B. An inner cylinder 14 is fixed to the bottom face of manifold 5 and is constructed with an enlarged portion 16 of increased diameter forming a housing containing the control unit A. An annular plate 18 is fixed between the cylinder or manifold 16 and the cylinder 2 to form the lower part of the housing for the control unit. The cylinder 16 extends below the plate 18 into fixed relation with a manifold 20, fixed in the cylinder 2, below which is disposed the fluid motor unit B, (partially shown).

The control unit A, comprises a pair of floating pistons 22 and 24 disposed within the cylinder 16, with the piston 22 having a central recess 26 adapted to receive a central extension 28 of the piston 24. A helical spring 30 is disposed around the extension 28 between the lower face 31 of the piston 22 and the top face 33 of the piston 24 for a purpose as will be hereinafter set out. The top portion of the piston 22 is provided with a passage 32, while the cylinder 14 has a port 34, and the piston 22 has a second port 36, for a purpose to be hereinafter set out. The cylinder 16 is provided with a port 38 disposed adjacent plate 18, and in communication with a port 40 in the piston 24.

The lower end of cylinder 16 is fixed to an annular projection 42 of the manifold 20, and the projection 42 is provided with a plurality of inlet ports 44 and a plurality of outlet ports 46. The manifold 20 has a central aperture 48 for receiving a motor shaft 50 having one end suitably journalled in roller bearings 52 arranged and supported within a recess 54 provided by the annular extension 42. The rotatable shaft 50 is provided with a plurality of radial vanes 56.

The control unit A comprising the pistons 22 and 24 functions to maintain a constant differential pressure between the input and discharge pressures of the fluid motor B. By input fluid pressure as distinguished from supply fluid pressure in aperture or port 8, is meant the pressure existing in port 12 communicating with the motor B. The discharge fluid pressure is considered existing in port 46 communicating with discharge or exhaust side of the motor. The fluid necessary for maximum operation of the motor B is provided by the higher supply fluid pressure in port 8 flowing into ports 12 and 44 at a volume regulated by the opening of a metering orifice 57 determined by lower portion of port 8 and manifold 5 and the top face 58 of piston 22. With the supply fluid such as gas or air coming from the source of fluid supply and acting against the top face 58 of the piston 22, the piston 22 is forced downward allowing the fluid to enter the ports 12 and 44 to provide an actuating medium for the motor B causing rotation of the vanes 56 with a simultaneous rotation of the shaft 50. It will be understood that the rotating shaft 50 may be connected to an apparatus such as a rotary pump, or like apparatus (not shown) capable of producing energy for any desired purpose.

It will be apparent that the supply fluid may be maintained at a pressure of such magnitude to operate the motor under most working conditions. The fluid volume required to operate the motor at maximum power is dependent upon the supply pressure as well as the velocity of fluid through orifice 57, said volume providing a certain fluid input pressure in port 12 as distinguished from the supply pressure in port 8. At no load of the motor a sufficient volume of fluid for maintaining maximum operation of the motor can be maintained with a slight opening of orifice 57 due to the high supply pressure cooperating with the areas of the pistons and pressure of spring 30. However, in utilizing the motor with a fluid actuated apparatus, any increase in load on the motor would decrease the speed of the motor unless the velocity of the fluid is regulated by opening the orifice 57 relative to the fluid supply pressure to maintain the necessary volume for maximum operation of the motor. It will be apparent that under load conditions of the motor, the input pressure in port 12 is increased as the necessary volume is maintained. With an increase in input pressure at load conditions, there is a simultaneous increase in discharge pressure from the motor to provide a constant differential pressure across the motor commensurate with the constant volume of fluid to the motor.

Under load conditions the discharge or exhaust fluid from the motor B flows through the outlet ports 46, through an aperture 60 in the plate 18 into contact with the bottom face 62 of the piston 24. The discharge fluid acting against the piston 24 causes movement of the piston 24 out of the recess 64 in plate 18 to allow the discharge fluid to flow through ports 38 into a space 66 between the cylinder 16 and the cylinder 2. It will be apparent with the piston 24 in raised position, the discharge fluid passes from chamber 66, through the outlet ports 6 to be used for whatever purpose may be desired. It will be understood that the space 66 is blocked off from port 12 by a baffle (not shown).

One example of the utilization of the control unit A is with a fluid motor for actuating a bottom hole rotary oil pump (not shown). With the discharge fluid passing into the space 66 it can flow through the outlet port 6 into the oil space 67 and can be utilized to assist the work of the pump in lifting the column of oil. It will be apparent that in a fluid actuated apparatus such as a rotary pump that the load demand upon the shaft 50 will be increased as the back pressure of the oil load against the pump is increased. In order to maintain a constant volume of fluid for the motor to actuate the pump at maximum power regardless of varying torque due to a changing load condition, the back pressure of the pump is by-passed through a port 68 into a chamber or space 70, where it contacts the face 72 of the piston valve 22, so that simultaneous with an increase in back pressure the piston 22 is moved downward to increase the opening of orifice 57 and thus regulates the fluid speed for maintaining the necessary volume of fluid.

In order to prevent any unusual variance in the speed of the fluid entering the motor, the discharge fluid pressure passing into chamber 66 is allowed to enter the port 40 into a chamber 69 and contact the lower face 31 of the piston 22, and with the discharge pressure of the motor being simultaneously increased with an increase in input fluid, the discharge pressure will act to force the piston 22 upward against the downward force of the back pressure in chamber 70 and supply in port 8 to effect a substantial balancing of pressure in cooperation with the areas of the piston. This balancing of pressure is effected regardless of the size or shape of the orifices 40 and 68.

The only velocity change of the fluid occurs at the metering orifice 57. At no load conditions with a large differential between the supply fluid in port 8 and the input fluid in port 12, obviously there is a greater velocity of fluid through orifice 57. Under load conditions wherein the differential pressure between the supply and input fluids is lessened, the velocity of fluid at orifice 57 is likewise lessened. Consequently, to maintain the necessary volume for maximum operation of the motor, the speed of fluid through orifice 57 must be regulated according to the differential pressure between the supply and input.

It will thus be seen that any varying load condition due to pump back pressure will not affect the maximum operation of the motor because of the automatic maintenance of a substantially constant differential between the input and discharge pressures of the motor B, allowing the motor to deliver the necessary torque or horsepower regardless of the load condition.

With the use of the control unit and fluid motor in an apparatus such as a rotary pump, or the like (not shown) it is necessary that the differential pressure across the fluid motor be of sufficient magnitude to produce a torque necessarily larger than the torque necessary to produce back pressure of the apparatus with which the motor is to be used.

It has been found in the use of the control unit A in a bottom hole rotary oil pump that the back pressure on the pump will be greatly decreased when a gas pocket condition is present in the bottom of the well. In such a condition the pump is pumping a compressible fluid instead of a solid or non-compressible fluid wherein the load is lightened to such an extent that there is a sudden attempt of the input and discharge pressures of the motor unit B to get at the same pressure, thereby causing a movement of pistons 22 and 24 toward each other. It will be apparent that this condition would cause a racing of the motor unit B. The spring 30 normally assists in retaining a constant differential between the input and discharge pressures of the motor under normal working conditions. However in an abnormal condition, such as a gas pocket, the tension of the spring will be overcome and thus facilitate movement of the pistons 22 and 24 toward each other. In the downward movement of piston 22 the ports 32 and 36 are brought in communication with the port 34 which allows the supply fluid to be introduced into the recess 26 of the piston 22 causing the piston 22 to be moved rapidly upward, thus shutting off the supply fluid and immediately stopping the racing of the motor until such time when the pressure in the recess 26 bleeds off into the space 69 and exhausts through the port 40, thus providing a retarding action until the torque demanded of the motor unit B again becomes normal.

From the foregoing it will be apparent that the control unit A functions to provide the necessary amount of fluid for a particular back pressure condition and with the input pressure at a higher magnitude than that which is necessary to rotate the motor unit B, the control unit functions to economically pass only the amount of supply fluid at a speed necessary to maintain a sufficient volume for actuation of the motor B at full power for any variable back pressure condition.

Figures 3 and 7 inclusive disclose a modified form of the invention wherein an outer cylinder 90 has disposed therein an inner cylinder 92 containing the control unit C as well as the motor unit D (partially shown). Fixed within the cylinder 92 is an upper manifold 94, an intermediate manifold 96, and a lower manifold 98 arranged in separate units in order to facilitate assembly and disassembly of the control unit C as will be hereinafter set out. The upper manifold 94 is provided with a threaded recess 100 for receiving a conduit communicating with a source of motive supply such as gas or air (not shown). The recess 100 is in communication with an inlet port 102. A central recess 104 is provided in the manifold 94 and receives a sleeve 105 integral with and extending outwardly from the intermediate manifold 96.

The manifold 96 has a minor bore 106 in alignment with the inner periphery of the sleeve 105, said minor bore in communication with an enlarged major bore 107 provided in the manifold 96. The lower manifold 98 has a recess 108 of slightly larger diameter than bore 107 and in communication therewith. The recess 108 is likewise in communication with a smaller recess 109 provided in the manifold 98. The construction of the manifolds 96 and 98 with the recesses and the sleeve 105 is such as to house a pair of floating pistons 110 and 112 of the unit control.

The upper piston 110 comprises a main annular body portion 113 having a centrally disposed boss extending from opposite sides of the body 113 and comprising an upper boss 114 and a lower boss 115. A recess 116 is provided in the boss and communicates with a recess 117 of smaller diameter. The upper boss 114 is disposed in the minor bore 106 and sleeve 105, and has an intermediate portion of reduced diameter at 118 for a purpose to be hereinafter set forth. In spaced relation to the lower projection or boss 115, an annular flange 120 is formed with the body 113 and provides a recess 121.

The lower piston 112 is substantially T-shaped in cross-section and is disposed in the recesses 108 and 109 of the manifold 98. The cross-portion 122 of the piston 112 is provided with an annular flange 123 forming a recess 124 in communication with recess 108. The lower portion 125 of the piston is disposed in the recess 109. It is to be noted that at the juncture of the recesses 108 and 109, the manifold 98 is provided with an annular flange or projection 126 extending slightly upward into the recess 108 for a purpose to be hereinafter set forth.

A helical spring 128 surrounds the upper boss 114 and is anchored in the major bore 107. A second helical spring 129 surrounds the lower boss 115 and is anchored in the recesses 121 and 124 between the pistons 110 and 112. A piston 130 is disposed in the recess 116 having its lower face contacting the top portion 131 of the cross-portion 122 for a purpose to be hereinafter set out.

The port 102 is in communication with a port 133 provided in the sleeve 105 to allow supply fluid to pass therethrough and around the reduced portion 118 of the boss 114. The reduced portion 118 is provided with a plurality of ports 134 in communication with the recesses 117 and 116. The sleeve 105 at a point diametrically opposite port 133 is provided with an orifice or port 136.

The supply fluid discharges from port 102 into and around the reduced portion 118, through the orifice 136 into a port 137 communicating with a port 138 and a recess 139 provided in the lower manifold 98. The recess or bore 139 comprises a pair of shoulder portions 140 and 141, with the portion 141 provided with threads for receiving a threaded sleeve 142. A recess or chamber 143 is provided below the bore 139 and has disposed therein a centrifugal type governor 144 adapted to cooperate with a slide valve 145 disposed within the sleeve 142. The sleeve 142 is provided with a port 146 providing communication between recess 139 and a port 147 leading to the motor unit D.

The centrifugal governor comprises a flanged member 148 integral with the rotating motor shaft 149 suitably journaled in the roller bearings 150. It will be understood that the shaft rotates the motor vanes 151 as in the preferred embodiment. A pair of wing members 152 and 153 are fixed to the flange 148 by the pivot pins 154. Each of the wing members are normally held in upright position by a helical spring 155 pivoted to the flange 148 and each of the wing members. The wing members are each provided with a normally horizontally disposed projection 156 adapted to contact the under face of the lower portion 157 of valve 145 for a purpose as will be hereinafter set forth.

In operation a supply of motivating fluid such as air or gas is directed from a source (not shown) into recess 100 and is discharged into the ports 102, 133 and 136. From the orifice 136 the input fluid passes through the port 137, recess 139, orifice 146 and into port 147 to provide input fluid to the motor unit proper to contact the motor vanes 151 and cause rotation of the motor unit at a velocity substantially equivalent to the velocity of the input fluid as determined by the orifice 136. At this point it is to be noted that the manifold 98 has a port 157' providing communication between port 137 and a chamber 158 whereby input fluid passing through port 137 enters into the chamber 158 below the piston 112.

The pressure of the input fluid entering chamber 158 will effect a movement of the piston valve 112 upward, however it will be apparent that input fluid passing through port 133 also flows through the ports 134 into the recesses 117 and 116, to react against the piston 130, which in conjunction with the springs 128 and 129 oppose the upward movement of the piston 112. The respective areas of the pistons 110, 112 and 130 cooperating with the pressures acting thereagainst create a static pressure condition within the space 158 below the piston valve 112 for a purpose as will be hereinafter set forth.

The input fluid causes actuation of the motor unit D and exhaust or discharge fluid from the motor discharges through a port 159 (Fig. 7) provided in the manifold 98 arranged at substantially 90° to the inlet port 137. The pressure of the discharge fluid in port 159 contacts the lower face 160 of piston 112 to assist the movement of the piston 112 upward. Upward movement of the piston 112 allows discharge fluid to enter an outlet port 161 provided in the manifolds.

The action of the inlet fluid pressure in chamber 157' in conjunction with the discharge fluid pressure in port 159 causes movement of the piston valve 112 upwardly to where the top face of the piston flange 123 contacts the lower face 162 of the manifold 96. The upward movement of the piston valve 112 is due to its larger area cooperating with the pressures to overcome the action of the springs 128 and 129 and the input pressure reacting against piston 130. It will be apparent that when the tension of spring 129 is overcome continued upward movement of the piston valve 112 would likewise cause upward movement of the piston valve 110 causing a closing off of the orifice 136 by the upper boss 114. However the control unit C is so constructed and arranged with its respective areas and the pressures in fixed relation to each other that the orifice 136 will not be completely closed off and will meter input fluid to maintain the necessary volume for maximum operation of the motor unit D.

It is necessary to utilize the discharge fluid pressure simultaneously with the input fluid pressure to actuate the control unit C wherein the orifice 136 provides the necessary volume to the motor so that a constant differential can be maintained across the motor to operate the motor at maximum velocity, regardless of any variable back pressure condition against the motor.

From the foregoing it will be apparent that the input fluid pressure and discharge fluid pressure actuate the control unit C to economically meter through the port 136 a predetermined amount of fluid at a speed necessary to maintain a predetermined differential on the motor. However with the use of the control unit in a bottom hole rotary oil pump or any engine having a varying back pressure condition (not shown) as in the preferred embodiment, the input fluid pressure demanded of the motor unit D increases with the pumping load, consequently to maintain a constant fluid volume commensurate with the differential pressure across the motor the orifice opening 136 must be regulated accordingly. It will be understood that as in the preferred embodiment the discharge fluid pressure in outlet port 161 is of greater magnitude than the back pressure present in the space 163 created by the fluid being pumped, so that the discharge fluid can be introduced into the pumping line at a point (not shown) in order to assist in the pumping of the fluid. In the utilization of the discharge fluid pressure to assist in the actuation of the control unit C, the discharge fluid in port 161 is discharged through a port 163' into a chamber 164 above the piston valve 110. Furthermore the discharge fluid is allowed to enter a port 165 leading into the recess 104 at a point above the upper boss 114. It will thus be apparent that the upward movement of the piston valves 112 and 110 is also opposed by the discharge fluid pressure reacting against the upper piston valve 110. Although the springs 128 and 129 primarily are for smoothing out the movement of the pistons, the spring 128 is of greater strength than spring 129 and likewise assists in opposing the upward movement of piston valve 110.

In a fluid actuated apparatus such as a bottom hole rotary oil pump (not shown) the back pressure of the oil load being pumped is constantly increasing and decreasing, and the orifice 136 must meter the input fluid to provide an input fluid pressure for the motor necessarily higher than the pressure necessary to overcome the back pressure of the pump.

As the back pressure load increases the pressure differential is maintained constant by by-passing part of the back pressure oil load through a port 166 providing communication between the oil space 163 and a chamber 167 above the piston valve 112. It will thus be seen that the pressure of the oil load assists the input and discharge fluid pressures in regulating the orifice 136 whereby the necessary volume of fluid for the motor can be maintained so as to maintain a constant pressure differential across the motor commensurate with any increased load condition.

As previously set forth in the preferred embodiment when the load of the motor unit is suddenly decreased due to a gas pocket or similar condition, any sudden release of the motor load would cause undue racing and consequent damage to the working parts. The centrifugal governor 144 mentioned, supra, provided in the unit prevents any undue racing of the motor due to a decreased load condition. With any increased abnormal rotation of the motor shaft 149 the wing members 152 and 153 due to centrifugal force are caused to be moved outward against the action of the springs 155. In the outward movement of the wing members the projections 156 have a lifting action against the lower portion 157 of the valve 145, wherein the valve 145 is moved upwardly closing off the port 146 supplying input fluid to the motor unit D until the load is increased.

Alluding further to the manifolds 94, 96 and 98 it will be noted that a bolt 170 secures the manifolds 94 and 96 together while the pins 171 hold the manifolds 96 and 98 with proper relation to each other.

While I have disclosed what I now consider to be the preferred embodiment of the invention in such manner that it may be readily understood by those skilled in the art, I am aware that changes may be made in the details without departing from the spirit of the invention as explained in the claims.

I claim:

1. A fluid pressure regulator for use with a fluid motor adapted to operate against a variable back pressure, comprising a plurality of cooperating pistons, supply fluid means cooperating with the pistons to provide an orifice, one of said pistons movable in response to supply fluid pressure to meter fluid through the orifice to the motor, said motor adapted to produce discharge fluid pressure under back pressure conditions, and means for diverting discharge fluid pressure from the motor operating against a back pressure against each of the pistons for controlling the movement of the first mentioned piston with respect to the orifice in order to control the velocity of the supply fluid passing the orifice.

2. A fluid regulator for controlling the flow of fluid to a fluid motor adapted to operate against a variable back pressure, comprising a plurality of cooperating pistons, a manifold cooperating with the pistons to provide a port, one of said pistons movable in response to supply fluid pressure to meter fluid through the port to the motor, means for introducing inlet fluid to the other of said pistons, and means for diverting discharge fluid pressure from the motor when operating against a back pressure against each of the pistons for automatically controlling the movement of the first mentioned piston with respect to the port whereby supply fluid is metered through the port at a velocity necessary for maximum operation of the motor against any back pressure condition.

3. A fluid regulator for use with a fluid motor acting against a variable back pressure condition comprising a supply fluid inlet, a plurality of cooperating pistons interposed between the fluid inlet and the motor, a manifold cooperating with the pistons to provide a port for introducing pressure fluid into the motor, one of said pistons movable in response to supply fluid pressure to meter fluid through the port, means for introducing inlet fluid to the other of said pistons, said motor adapted to produce discharge pressure under load conditions and means for diverting discharge fluid pressure from the motor when operating against a back pressure against each of the pistons for controlling the movement of the first mentioned piston with respect to the port to maintain a constant pressure differential across the motor regardless of the back pressure condition acting against the motor.

4. A fluid regulator for use with a fluid motor acting against a variable back pressure condition, comprising a plurality of floating pistons, a manifold cooperating with one of the pistons to provide an orifice, one of said pistons movable in response to supply fluid pressure to pass fluid through the orifice to the motor, and means for directing flow of discharge fluid pressure from the motor when acting against a back pressure against the pistons for controlling the movement of the first named piston with respect to the orifice.

5. A fluid regulator for use with a fluid motor operating against a variable back pressure, comprising a plurality of floating pistons, a manifold cooperating with one of the pistons to provide a port, one of said pistons movable in response to supply fluid pressure to orifice fluid through the port to the motor, said motor adapted to produce discharge pressure under back pressure conditions, and a plurality of ports for directing discharge fluid pressure from the motor when acting against a back pressure against the pistons for controlling the movement of the first named piston with respect to the first named port to meter fluid to the motor at a velocity necessary to actuate the motor against any back pressure condition.

6. In combination with a conduit leading from a source of motive fluid to a fluid motor operating against a variable back pressure, a fluid regulator disposed in said conduit and comprising a chamber having a plurality of floating cooperating pistons disposed therein, a port for introducing pressure fluid into the motor, one of said pistons movable in response to supply fluid pressure to meter fluid through the port, means for introducing metered fluid to react against the other of said pistons, and means for diverting discharge fluid pressure from the motor when operating against a back pressure against each of said pistons for controlling the movement of the first mentioned piston with respect to the port to meter supply fluid at a velocity necessary for the maximum operation of the motor regardless of the back pressure condition.

7. In combination with a conduit leading from a source of motive fluid to a fluid motor operating against a variable back pressure condition, a fluid regulator interposed between the fluid inlet and the motor, and comprising a plurality of manifolds, a recess in each of said manifolds, a plurality of axially disposed cooperating pistons providing an upper and lower piston, said upper piston disposed in the recess of one of the manifolds, said lower piston disposed in the recess of the other of said manifolds, a sleeve disposed in the recess of one of the manifolds, a plurality of ports in the sleeve providing communication between the conduit and the fluid motor, said upper piston movable in response to supply fluid pressure to meter fluid through one of said ports to the motor, an intermediate piston disposed between the upper and lower pistons, a port in the upper piston for introducing supply fluid into contact with the intermediate piston, a port provided in one of the manifolds for introducing metered fluid against the bottom face of the lower piston, and means providing communication for discharge fluid from the motor to the pistons whereby the discharge fluid pressure from the motor when acting against a back pressure assists the supply fluid pressure in controlling the movement of the upper piston with respect to the metering port, spring means surrounding the upper and lower pistons and cooperating with the pressures to assist the control of the upper piston, a valve interposed between the fluid regulator and the fluid motor, and a governor adapted to move the valve for restricting the flow of fluid to the motor upon any abnormal racing of the motor.

8. A fluid regulator for controlling the flow of fluid to a fluid motor operating against a variable back pressure and comprising a plurality of cooperating pistons, a manifold disposed above the pistons having a conduit through which the supply fluid passes, said manifold having one face thereof cooperating with one of said pistons to provide a metering orifice for the fluid, one of said pistons movable in response to supply fluid pressure, to meter fluid through the orifice at sufficient volume for maximum operation of the motor at any back pressure condition, and means for diverting discharge fluid pressure from the motor when acting against a back pressure condition against each of the pistons for automatically controlling the movement of the first mentioned piston with respect to the manifold face.

HAROLD R. DOWNS.